(12) United States Patent
Wang et al.

(10) Patent No.: US 10,187,498 B2
(45) Date of Patent: Jan. 22, 2019

(54) METHOD AND APPARATUS FOR SETTING WAITING TIME DURATION

(71) Applicant: Xiaomi Inc., Beijing (CN)

(72) Inventors: Zhongshuai Wang, Beijing (CN); Yizhen Yang, Beijing (CN); Ning Ma, Beijing (CN)

(73) Assignee: Xiaomi Inc., Beijing (CN)

( * ) Notice: Subject to any disclaimer, the term of this patent is extended or adjusted under 35 U.S.C. 154(b) by 16 days.

(21) Appl. No.: 15/390,990

(22) Filed: Dec. 27, 2016

(65) Prior Publication Data

US 2017/0187847 A1    Jun. 29, 2017

(30) Foreign Application Priority Data

Dec. 28, 2015  (CN) .......................... 2015 1 1000892

(51) Int. Cl.
| | |
|---|---|
| *H04L 29/06* | (2006.01) |
| *G06F 9/54* | (2006.01) |
| *G06F 13/10* | (2006.01) |
| *H04W 72/04* | (2009.01) |

(52) U.S. Cl.
CPC ................ *H04L 69/28* (2013.01); *G06F 9/54* (2013.01); *G06F 13/105* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2002/0048335 | A1* | 4/2002 | Saeki ...................... | H04L 25/14 375/371 |
| 2011/0074417 | A1* | 3/2011 | Kitane ................. | A61B 5/0263 324/309 |
| 2014/0281622 | A1* | 9/2014 | Wagh .................... | G06F 1/3206 713/323 |

FOREIGN PATENT DOCUMENTS

| | | |
|---|---|---|
| GB | 2502604 A | 12/2013 |
| WO | WO 2017/113927 A1 | 7/2017 |

OTHER PUBLICATIONS

Extended Search Report for European Application No. 16206464.6 from the European Patent Office, dated May 12, 2017.
English version of International Search Report of PCT Application No. PCT/CN2016/101626, dated Jan. 20, 2017, issued by the ISA/CN—State Intellectual Property Office of the P.R. China.
Video Electronics Standards Association, *VESA Mobile Display Digital Interface Standard*, Version 1, Jul. 23, 2004, pp. 1-172.

* cited by examiner

*Primary Examiner* — Anh Ngoc M Nguyen
(74) *Attorney, Agent, or Firm* — Finnegan, Henderson, Farabow, Garrett & Dunner LLP (57) ABSTRACT

A method for setting a waiting time duration includes: controlling a target component to send preset data to a processor a plurality of times, and controlling the processor to receive the preset data sent by the target component each time based on a different waiting time duration; determining, from the different waiting time durations, a maximum waiting time duration and a minimum waiting time duration that are used by the processor for correctly receiving the preset data; and determining and storing a to-be-used waiting time duration according to the maximum waiting time duration and the minimum waiting time duration.

15 Claims, 4 Drawing Sheets

METHOD AND APPARATUS FOR SETTING WAITING TIME DURATION

CROSS-REFERENCE TO RELATED APPLICATIONS

This application is based upon and claims priority to Chinese Patent Application No. 201511000892.6, filed on Dec. 28, 2015, the entire contents of which are incorporated herein by reference.

TECHNICAL FIELD

The present disclosure relates to the field of computer technologies, and more particularly, to a method and an apparatus for setting a waiting time duration.

BACKGROUND

As computer technologies advance, mobile terminals, such as mobile phones, perform more and more powerful functions, such that mobile terminals are indispensable in people's daily life. Various parts of a mobile terminal generally need to transmit data to a processor thereof, via two paths of level signals. Hereinafter, the course of transmitting data by the parts to the processor is given by using a camera as an example.

In the prior art, after a camera of a mobile terminal picks up an image, the camera generally needs to transmit image data to the processor. The processor processes the received image data. Data is transmitted between the camera and the processor of the mobile terminal generally by using Mobile Industry Processor Interface (MIPI) protocol. Each time data is transmitted, the level signals transmitted by the camera may be categorized into a plurality of stages in terms of time sequence, which are respectively an LP-11 stage (a control mode stage), an LP-01 stage (a high-speed request stage), an LP-00 stage (a preparation stage), an HS-0 stage (a reception waiting stage), and a data transmission stage. In the LP-11 stage, the two paths of level signals are both at a high level; in the LP-01 stage, one of the two paths of level signals is at a high level and the other is at a low level; in the LP-00 stage, the two paths of level signals are both at a low level; in the HS-0 stage, the voltages of the two paths of level signals are increased to be within a voltage range of differential signals to form differential signals; and in the data transmission stage, the two paths of level signals remain in the state of the differential signals for data transmission.

Generally, during the course of data transmission, a time duration of the LP-00 stage may be changed due to signal line impedance. A waiting time duration may be preconfigured in the processor. After the processor begins to receive data, it detects when an input signal changes from the LP-01 stage to the LP-00 stage. That is, it detects that one of the two paths of level signal remains at a low level and the other is changed from a high level to a low level. After a preset waiting time duration from the point of entering the LP-00 stage, the processor starts detecting a start point of the HS-0 stage. That is, it detects that the voltages of the two paths of level signals are increased to be within the voltage range of the differential signals. Upon detection of the start point, the processor waits for a preset time duration of the HS-0 stage to run, before it starts detecting data on the differential signals, so as to obtain the data transmitted by the camera. Based on the MIPI protocol, the above waiting time duration needs to be within a range of a standard time duration stipulated by the MIPI protocol. Further, the time duration from the end of the waiting time duration to the start of the HS-0 stage also needs to be within a range of a standard time duration stipulated by the MIPI protocol, such that the processor can correctly receive data.

Based on the basic principles of the above-described data transmission, a person skilled in the art generally tests a plurality sample terminals of the same model for setting a waiting time duration of a processor. A time duration of the LP-00 stage of the signals received by the processor of each terminal is measured using an oscilloscope to calculate an average value of the time durations. A person skilled in the art then uses a time duration obtained by dividing the average value by two as the preset waiting time duration of the mobile terminals of the model.

During implementation of the present disclosure, the inventors have identified at least the following drawbacks in the related technologies.

A person skilled in the art uses half of the average value of the time durations of the LP-00 stage of a plurality of sample terminals as the waiting time duration of the processor. Because of mass production of the mobile terminals, time durations of the LP-00 stage of level signals received by processors of different mobile terminals may vary greatly. In addition, while the mobile terminals are used, line impedance in the mobile terminals may be changed due to various reasons, such that the time durations of the LP-00 stage of the level signals received by the processors may be changed accordingly. Since each mobile terminal is given a fixed waiting time duration, in some mobile terminal, the time duration from the end of the waiting time duration to the start of the HS-0 stage may not be within the range of the standard time duration stipulated by the MIPI protocol. Consequently, the data read by the processor may be incorrect.

SUMMARY

According to one aspect of the present disclosure, there is provided a method for setting a waiting time duration. The method includes: controlling a target component to send preset data to a processor a plurality of times, and controlling the processor to receive the preset data sent by the target component each time based on a different waiting time duration; determining, from the different waiting time durations, a maximum waiting time duration and a minimum waiting time duration that are used by the processor for correctly receiving the preset data; and determining and storing a to-be-used waiting time duration according to the maximum waiting time duration and the minimum waiting time duration.

According to another aspect of the present disclosure, there is provided an apparatus for setting a waiting time duration. The apparatus includes a processor and a memory for storing instructions executable by the processor. The processor is configured to: control a target component to send preset data to a processor a plurality of times, and control the processor to receive the preset data sent by the target component each time based on a different waiting time duration; determine, from the different waiting time durations, a maximum waiting time duration and a minimum waiting time duration that are used by the processor for correctly receiving the preset data; and determine and store a to-be-used waiting time duration according to the maximum waiting time duration and the minimum waiting time duration.

According to another aspect of the present disclosure, there is provided a non-transitory computer-readable storage medium having stored therein instructions that, when executed by one or more processors of an apparatus, cause the apparatus to perform: controlling a target component to send preset data to a processor a plurality of times, and controlling the processor to receive the preset data sent by the target component each time based on a different waiting time duration; determining, from the different waiting time durations, a maximum waiting time duration and a minimum waiting time duration that are used by the processor for correctly receiving the preset data; and determining and storing a to-be-used waiting time duration according to the maximum waiting time duration and the minimum waiting time duration.

It shall be appreciated that the above general description and the detailed description hereinafter are only illustrative and interpretative but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure. Among the drawings.

The above drawings are used for illustrating the embodiments of the present disclosure given hereinafter, and more details will be given hereinafter. These drawings and textual descriptions are not intended to limit the scope defined in the present disclosure in any way, but intended to describe the inventive concept of the present disclosure, through specific embodiments, for a person skilled in the art.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

An exemplary embodiment of the present disclosure provides a method for setting a waiting time duration. The method for setting a waiting time duration may be performed by a terminal, which may be a mobile phone or the like. A processor, a memory, a camera, and the like may be provided in the terminal. The processor may be a central processing unit, which is configured to set a waiting time duration. The memory may be configured to store data needed for setting a waiting time duration and other data. The camera may be configured to pick up images. The terminal may further include an input and output device such as a screen and the like. The screen may display an operation interface of the terminal and may be a touch screen. In the following embodiments, the technical solution of the present disclosure is described in detail where the terminal is a mobile phone. The mobile phone includes a processor and a camera as a target component configured to send data to the processor.

Figure 1:
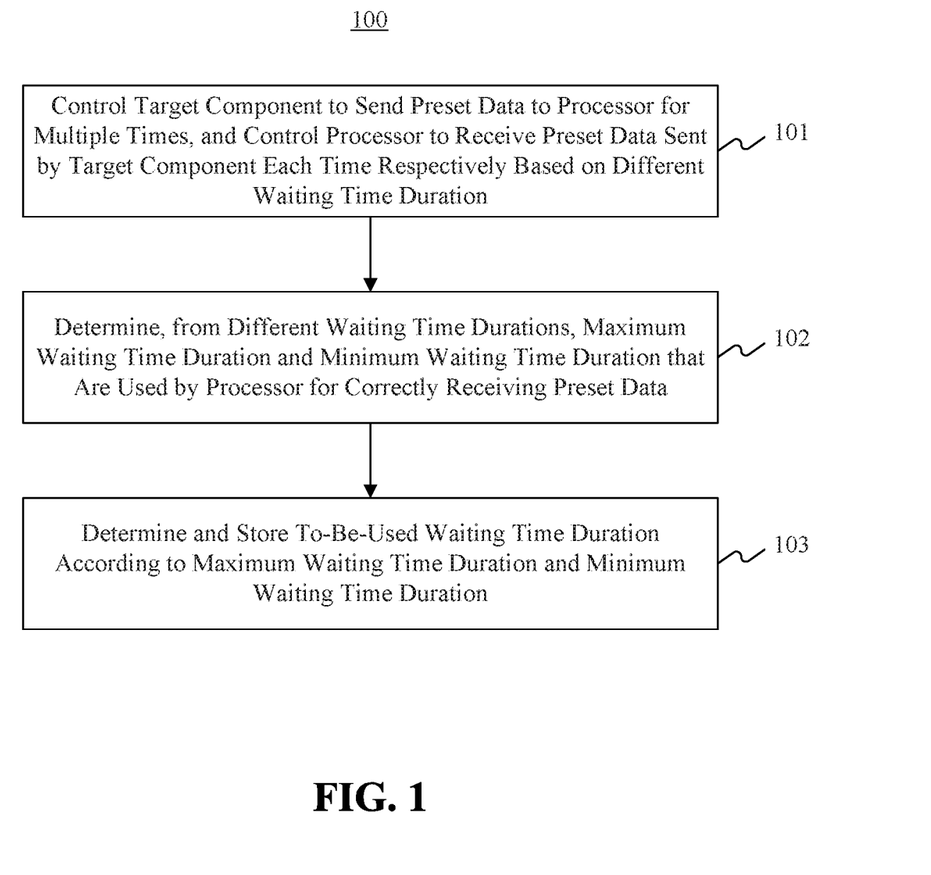
FIG. 1 is a flowchart illustrating a method for setting a waiting time duration according to an exemplary embodiment of the present disclosure.

FIG. 1 is a flow chart illustrating a method 100 for setting a waiting time duration according to an exemplary embodiment. As illustrated in FIG. 1, the method 100 includes the following steps.

In step 101, a target component is controlled to send preset data to a processor multiple times, and the processor is controlled to receive the preset data sent by the target component each time based on a different waiting time duration.

Figure 2:
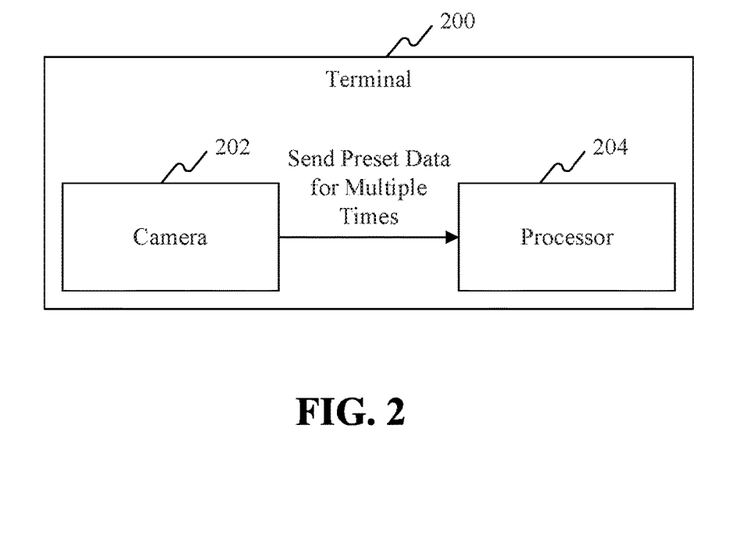
FIG. 2 is a block diagram of a terminal according to an exemplary embodiment of the present disclosure.

In some embodiments, a person skilled in the art may preset a string of preset data, for example, 10012233 and the like, and store the preset data to the terminal. FIG. 2 show a block diagram of a terminal 200 consistent with embodiments of the present disclosure. As illustrated in FIG. 2, the terminal 200 includes a camera 202 and a processor 204. When the terminal 200 is turned on, it controls the camera 202 to acquire the preset data and send the preset data to the processor 204 multiple times. Each time the preset data is transmitted, level signals transmitted by the camera 202 are categorized into a plurality of stages in terms of time sequence, which includes, in sequence, an LP-11 stage (a control mode stage), an LP-01 stage (a high-speed request stage), an LP-00 stage (a preparation stage), an HS-0 stage (a reception waiting stage), and a data transmission stage. The processor 204 receives the preset data sent by the camera 202 each time based on a different waiting time duration. After the processor 204 begins to receive the preset data, it detects when an input signal changes from the LP-01 stage to the LP-00 stage. That is, it detects that one of the two level signals remains at a low level and that the other changes from a high level to a low level. After a lapse of a preset waiting time duration from the time of entering the LP-00 stage, the processor 204 starts to detect a start point of the HS-0 stage. That is, it detects that the voltages of the two level signals are increased to a voltage range of the differential signals. Upon detection of the start point, the processor 204 waits for a preset time duration of the HS-0 stage to lapse, before it starts detecting data on the differential signals, so as to obtain the data transmitted by the camera 202. The received data is compared with the preset data stored in the terminal 200. If it is determined that the received data are identical to the preset data, the waiting time duration used to receive the preset data may be stored, and an indicator indicating that the preset data is correctly received at this time using the waiting time duration. If it is determined that the received data are not identical to the preset data, the waiting time duration used to receive the preset data may also be stored, and an indicator indicating that the preset data is not correctly received at this time using the waiting time duration may be stored.

In one embodiment, each of the different waiting time durations is set within a standard time duration stipulated by the MIPI protocol. The processor is controlled to receive the preset data sent by the target component each time based on a different waiting time duration.

For example, each of the different waiting time durations used by the processor 204 to receive data sent by the camera 202 is set within the standard time duration stipulated by the MIPI protocol. The terminal 200 may control the camera 202 to send the preset data to the processor 204 multiple times, and control the processor 204 to receive, based on the different waiting time durations, the preset data sent so that the processor 204 correctly receives the preset data each time.

In some embodiments, the different waiting time durations are set using a preset time duration difference. For example, in a series of different waiting time durations, a difference between two adjacent waiting time durations can be the preset time duration difference. The processor 204 can be controlled to receive the preset data sent by the camera 202 each time using one of the series of different waiting time durations.

The preset time duration difference may be defined by a person skilled in the art. A smaller preset time duration difference means that more different waiting time durations are employed to receive the preset data. Thus, it takes a longer time to test all of the different waiting time durations for determining an acceptable waiting time duration. The acceptable waiting time duration enables the processor 204 to correctly receive the preset data sent by the camera 202. In this case, the determined waiting time duration is closer to an intermediate value of the duration of the LP-00 stage of the level signals received by the processor 204 and thus may be considered closer to an intermediate value of the duration of the LP-00 stage of the camera 202. A greater preset time duration difference means that fewer different waiting time durations are employed to receive the preset data. Thus, it takes a shorter time to test all of the different waiting time durations for determining an acceptable waiting time duration. The acceptable waiting time duration enables the processor 204 to correctly receive the preset data sent by the camera 202. In this case, the determined waiting time duration deviates more from an intermediate value of the duration of the LP-00 stage of the level signal received by the processor 204 and thus may be considered to deviate more from an intermediate value of the duration of the LP-00 stage of the camera 202. A person skilled in the art can define a preset time duration difference according to actual needs.

In some embodiments, a person skilled in the art may define a preset waiting time duration T0 with which the processor 204 is able to correctly receive the preset data sent by the camera 202, and store the waiting time duration T0 in the terminal 200. After the processor 204 receives the preset data sent by the camera 202, the terminal 200 controls the processor 204 to receive image data from the camera 202 according to the preset waiting time duration T0. Due to effects caused by the line impedance during data transmission, the time duration of the LP-00 stage of the level signals received by the processor 202 may be affected. This causes the processor 204 to fail to correctly receive the preset data. The terminal 200 controls the processor 204 to adaptively adjust T0 until the processor 204 is able to correctly receive the preset data. The adjusted time duration is recorded as T1. Afterwards, a preset time duration difference $\Delta t$ may be added to or subtracted from the preset waiting time duration T1. For example, a series of waiting time durations may be (T1−n$\Delta t$), . . . , (T1−2$\Delta t$), (T1−$\Delta t$), T1, (T1+$\Delta t$), (T1+2$\Delta t$) . . . (T1+n$\Delta t$). The processor 204 is configured to receive the preset data sent by the camera 202 multiple times based on the series of waiting time durations to determine in which waiting time duration the processor 204 can or cannot correctly receive the preset data. The terminal 200 can store each waiting time duration and its corresponding result of whether the processor 204 can correctly receive the preset data. For example, if the time duration with which the processor 204 is able to receive the preset data is T1, the terminal 200 controls the processor 204 to receive, based on the waiting time durations (T1−n$\Delta t$), . . . (T1−2$\Delta t$), (T1−$\Delta t$), T1, (T1+$\Delta t$), (T1+2$\Delta t$), . . . (T1+n$\Delta t$), the preset data sent by the camera 202 to determine when the processor 204 is able or unable to correctly receive the present data sent by the camera 202.

Referring again to FIG. 1, in step 102, a maximum waiting time duration and a minimum waiting time duration that can be used by the processor to correctly receive the preset data are determined from the different waiting time durations.

In some embodiments, the processor 204 receives, each time based on a different waiting time duration, the preset data sent by the camera 202. The terminal 200 records a plurality of different waiting time durations and the corresponding detailed information about receiving the preset data. The terminal 200 can determine, from the plurality of different waiting time durations, the maximum waiting time duration and the minimum waiting time duration that can be used by the processor 204 for correctly receiving the preset data. The terminal 200 can store the maximum and minimum waiting time durations.

In some embodiments, the maximum waiting time duration and the minimum waiting time duration of the processor 204 may be determined as follows. With respect to a first waiting time duration and a second waiting time duration that are adjacent to each other in a series of different waiting time durations, if the processor 204 is able to correctly receive the preset data by using the first waiting time duration but is unable to correctly receive the preset data by using the second waiting time duration, and the first waiting time duration is less than the second waiting time duration, it is determined that the first waiting time duration is the maximum waiting time duration that can be used by the processor 204 for correctly receiving the preset data.

With respect to a third waiting time duration and a fourth waiting time duration that are adjacent to each other in the series of different waiting time durations, if the processor 204 is able to correctly receive the preset data by using the fourth waiting time duration but is unable to correctly receive the preset data by using the third waiting time duration, and the third waiting time duration is less than the fourth waiting time duration, it is determined that the fourth waiting time duration is the minimum waiting time duration that can be used by the processor for correctly receiving the preset data.

Figure 3:
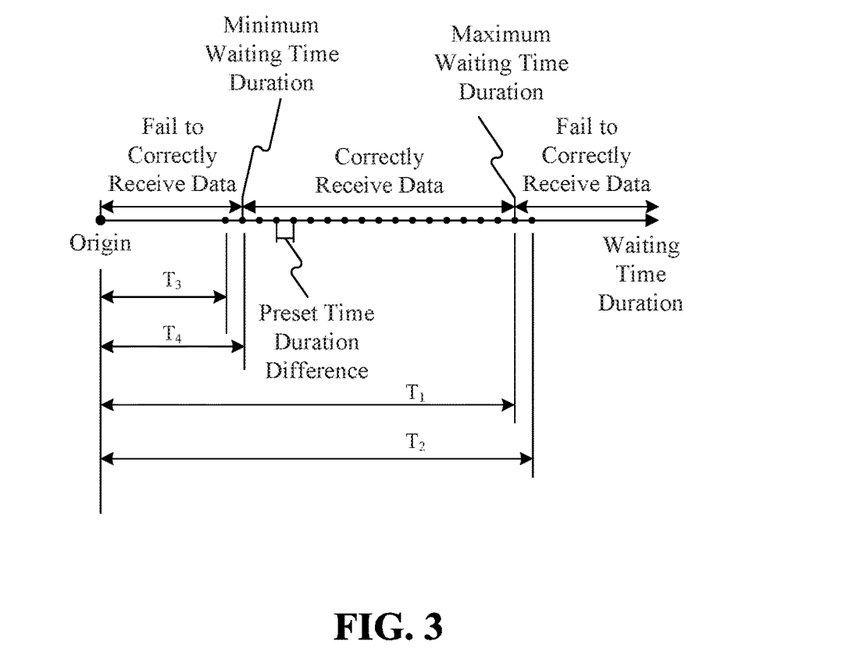
FIG. 3 is a schematic time chart illustrating waiting time durations according to an exemplary embodiment of the present disclosure.

In some embodiments, as illustrated in FIG. 3, the terminal 200 searches for two waiting time durations adjacent to each other from the different waiting time durations, i.e., the first waiting time duration $T_1$ and the second waiting time duration $T_2$. If the processor 204 is able to correctly receive the preset data by using the first waiting time duration $T_1$ but is unable to correctly receive the preset data by using the second waiting time duration $T_2$, and the first waiting time duration $T_1$ is less than the second waiting time duration $T_2$, the processor 204 determines that the first waiting time duration $T_1$ is the maximum waiting time duration for correctly receiving the preset data. For example, a standard time duration stipulated by the MIPI protocol is from 2 ns to 15 ns, which means that both the waiting time duration of the LP-00 stage and a time duration from the end of the waiting time duration of the LP-00 stage to a time when the starting point of the HS-0 stage is detected need to be within the range of 2 ns to 15 ns. It is assumed that a duration of the LP-00 stage of the preset data sent by the camera is 15 ns. The processor 204 receives the preset data by using a first waiting time duration of 13 ns. In this case, the processor 204 enters from the LP-01 stage to the LP-00 stage, waits for 13 ns before starting to detect a start point of the HS-0 stage, and detects the start point of the HS-0 stage at in another 2 ns, both of which are within the range of 2 ns to 15 ns of the standard time duration of the LP-00 stage stipulated by the MIPI protocol. The processor 204 is able to correctly receive the preset data. The processor 204 further receives the preset data by using a second waiting time duration of 14 ns. In this case, the processor 204 enters from the LP-01 stage to the LP-00 stage, waits for 14 ns before starting to detect a start point of the HS-0 stage, and detects the start point of the HS-0 stage at in another 1 ns, which is not within the range of 2 ns to 15 ns of the standard time duration stipulated by the MIPI protocol. As a result, the processor 204 is unable to correctly receive the preset data. In this example, the first waiting time duration of 13 ns is determined to be the maximum waiting time duration.

Further, the terminal searches for another two waiting time durations adjacent to each other from the different waiting time durations, e.g., a third waiting time duration $T_3$ and a fourth waiting time duration $T_4$. If the processor 204 is able to correctly receive the preset data by using the fourth waiting time duration $T_4$ but is unable to correctly receive the preset data by using the third waiting time duration $T_3$, and the third waiting time duration $T_3$ is less than the fourth waiting time duration $T_4$, the processor 204 determines that the fourth waiting time duration $T_4$ is the minimum waiting time duration for correctly receiving the preset data. For example, the range of the standard time duration stipulated by the MIPI protocol is from 2 ns to 15 ns, which means that both the waiting time duration of the LP-00 stage and a time duration from the end of the waiting time duration of the LP-00 stage to a time when the starting point of the HS-0 stage is detected need to be within the range of 2 ns to 15 ns. It is assumed that a duration of the LP-00 stage of the preset data sent by the camera is 15 ns. The processor 204 receives the preset data by using the fourth waiting time duration of 2 ns. In this case, the processor 204 enters from the LP-01 stage to the LP-00 stage, waits for 2 ns before starting to detect a start point of the HS-0 stage, and detects the start point of the HS-0 stage in another 13 ns, both of which are within the range of 2 ns to 15 ns of the standard time duration stipulated by the MIPI protocol. The processor 204 is able to correctly receive the preset data. The processor 204 further receives the preset data by using the third waiting time duration of 1 ns. In this case, the processor 204 enters from the LP-01 stage to the LP-00 stage, waits for 1 ns before starting to detect a start point of the HS-0 stage, and detects the start point of the HS-0 stage in another 14 ns. But 1 ns is not within the range of 2 ns to 15 ns of the standard time duration stipulated by the MIPI protocol. As a result, the processor 204 is unable to correctly receive the preset data. In this example, the fourth waiting time duration of 2 ns is determined to be the minimum waiting time duration.

Referring back to FIG. 1, in step 103, a to-be-used waiting time duration is determined according to the maximum waiting time duration and the minimum waiting time duration, and the determined to-be-used waiting time duration is stored.

In this embodiment, the terminal 200 can calculate the to-be-used waiting time duration for the processor 204 according to the maximum waiting time duration and the minimum waiting time duration, and then store the to-be-used waiting time duration. After that, the terminal 200 controls the camera 202 to stop sending the preset data to the processor 204.

In some embodiments, an average value of the maximum waiting time duration and the minimum waiting time duration may be employed as the to-be-used waiting time duration. For example, the step 103 may include determining an average value of the maximum waiting time duration and the minimum waiting time duration and storing the average value as the to-be-used waiting time duration.

In the illustrated embodiment, since the maximum waiting time duration and the minimum waiting time duration are respectively a maximum time duration and a minimum waiting time duration that can be used for correctly receiving the preset data, the terminal 200 calculates an average value of the maximum waiting time duration and the minimum waiting time duration, which may be considered to be approximately equal to an intermediate value of the time duration of the LP-00 stage of the level signals received by the processor 204. The terminal 200 stores the average value of the maximum waiting time duration and the minimum waiting time duration as the to-be-used waiting time duration for the processor 204.

In some embodiments, when service data subsequently transmitted by the target component to the processor is detected, the service data is received based on the to-be-used waiting time duration.

In the illustrated embodiments, the terminal 204 stores the to-be-used waiting time duration. When the processor 204 subsequently receives image data sent by the camera 202, the terminal 200 controls the processor 204 to receive the image data according to the stored to-be-used waiting time duration. That is, when the processor detects an entry from the LP-01 stage to the LP-00 stage, it waits for the to-be-used waiting time duration before it starts to detect the start point of the HS-0 stage. In a preset time duration after the start point of the HS-0 stage, the terminal starts detecting the differential signals to receive the service data.

According to the embodiments of the present disclosure, a target component is controlled to send preset data to a processor multiple times, and the processor is controlled to receive the preset data sent by the target component each time based on a different waiting time duration. A maximum waiting time duration and a minimum waiting time duration that can be used by the processor for correctly receiving the preset data are determined from the different waiting time durations. A to-be-used waiting time duration is determined according to the maximum waiting time duration and the minimum waiting time duration. The determined to-be-used waiting time duration is stored in the terminal. In this way, a waiting time duration of the processor may be set for each terminal to accommodate, for example, line impedance of each terminal such that its processor may correctly receive service data.

Figure 4:
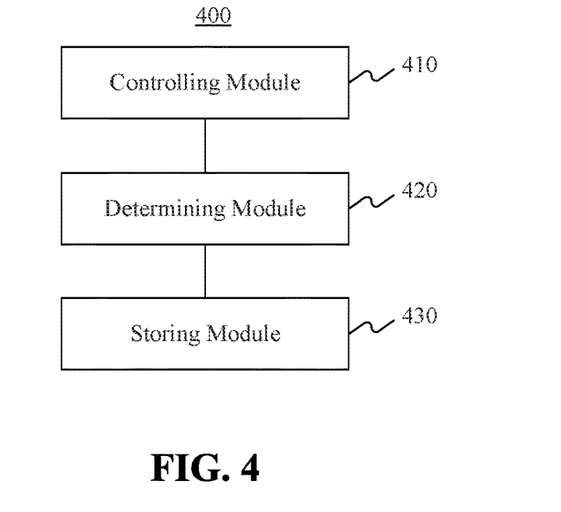
FIG. 4 is a block diagram illustrating a terminal according to an exemplary embodiment of the present disclosure.

Another exemplary embodiment of the present disclosure further provides an apparatus 400 for setting a waiting time duration. FIG. 4 shows a block diagram of apparatus 400. As illustrated in FIG. 4, the apparatus 400 include a controlling module 410, a determining module 420, and a storing module 430.

The controlling module 410 is configured to control a target component of the apparatus 400 to send preset data to a processor of the apparatus 400 multiple times, and control the processor to receive the preset data sent by the target component each time based on a different waiting time duration.

The determining module 420 is configured to determine, from the different waiting time durations, a maximum waiting time duration and a minimum waiting time duration that can be used by the processor for correctly receiving the preset data.

The storing module 430 is configured to determine and store a to-be-used waiting time duration according to the maximum waiting time duration and the minimum waiting time duration.

In some embodiments, the controlling module 410 is configured to control the processor to receive the preset data sent by the target component respectively based on a plurality of different waiting time durations having an interval of a preset time duration difference between two adjacent waiting time durations.

Figure 5:
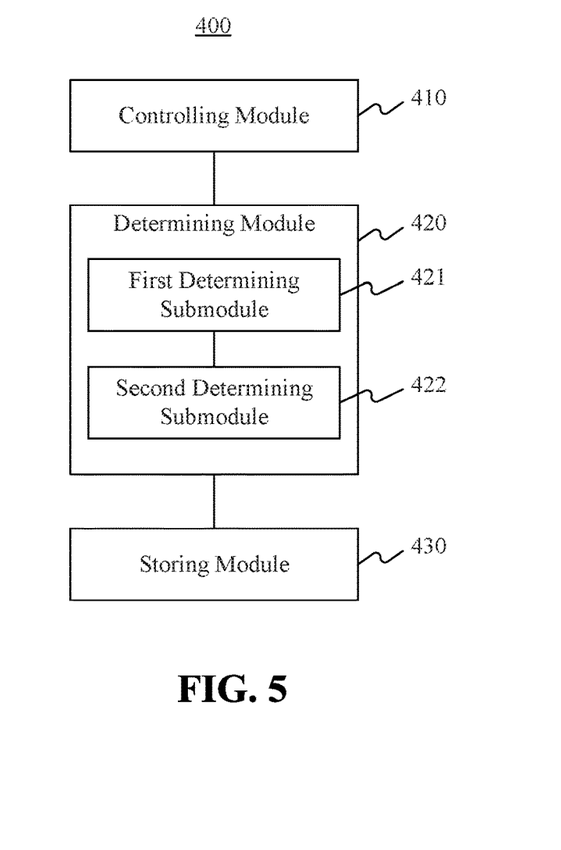
FIG. 5 is a block diagram illustrating a terminal according to an exemplary embodiment of the present disclosure.

In some embodiments, the controlling module 410 is configured to control the processor to receive the preset data sent by the target component each time based on a different waiting time duration, which is within a standard time duration stipulated by the MIPI protocol, In some embodiments, as illustrated in FIG. 5, the determining module 420 includes a first determining submodule 421 and a second determining submodule 422.

With respect to a first waiting time duration and a second waiting time duration that are adjacent in a series of the different waiting time durations, the processor is able to correctly receive the preset data by using the first waiting time duration but is unable to correctly receive the preset data by using the second waiting time duration, the first waiting time duration being less than the second waiting time duration. The first determining submodule 421 is configured to determine that the first waiting time duration is the maximum waiting time duration that can be used by the processor for correctly receiving the preset data.

With respect to a third waiting time duration and a fourth waiting time duration that are adjacent in a series of the different waiting time durations, the processor is able to correctly receive the preset data by using the fourth waiting time duration but is unable to correctly receive the preset data by using the third waiting time duration, the third waiting time duration being less than the fourth waiting time duration. The second determining submodule 422 is configured to determine that the fourth waiting time duration is the minimum waiting time duration that can be used by the processor for correctly receiving the preset data.

In some embodiments, the storing module 430 is configured to determine and store an average value of the maximum waiting time duration and the minimum as the to-be-used waiting time duration.

In some embodiments, the controlling module 410 is further configured to, when service data subsequently transmitted by the target component to the processor is detected, receive the service data based on the to-be-used waiting time duration.

According to the embodiments of the present disclosure, a target component is controlled to send preset data to a processor multiple times, and the processor is controlled to receive the preset data sent by the target component each time based on a different waiting time duration. A maximum waiting time duration and a minimum waiting time duration that are used by the processor for correctly receiving the preset data are determined from the different waiting time durations. A to-be-used waiting time duration is determined according to the maximum waiting time duration and the minimum waiting time duration. The determined to-be-used waiting time duration is stored. In this way, a waiting time duration of the processor may be set for each terminal to accommodate, for example, line impedance of each terminal such that its processor may correctly receive data.

In some embodiments, the functions performed by the above modules or submodules may be assigned to different functional modules for implementation as required. To be specific, the internal structure of the apparatus is divided into different functional modules to implement all or part of the above-described functions. In addition, the apparatuses for setting a waiting time duration according to the above embodiments are based on the same inventive concept as the above-described methods for setting a waiting time duration. The specific implementation is elaborated in the method embodiments, which is not described further.

Figure 6:
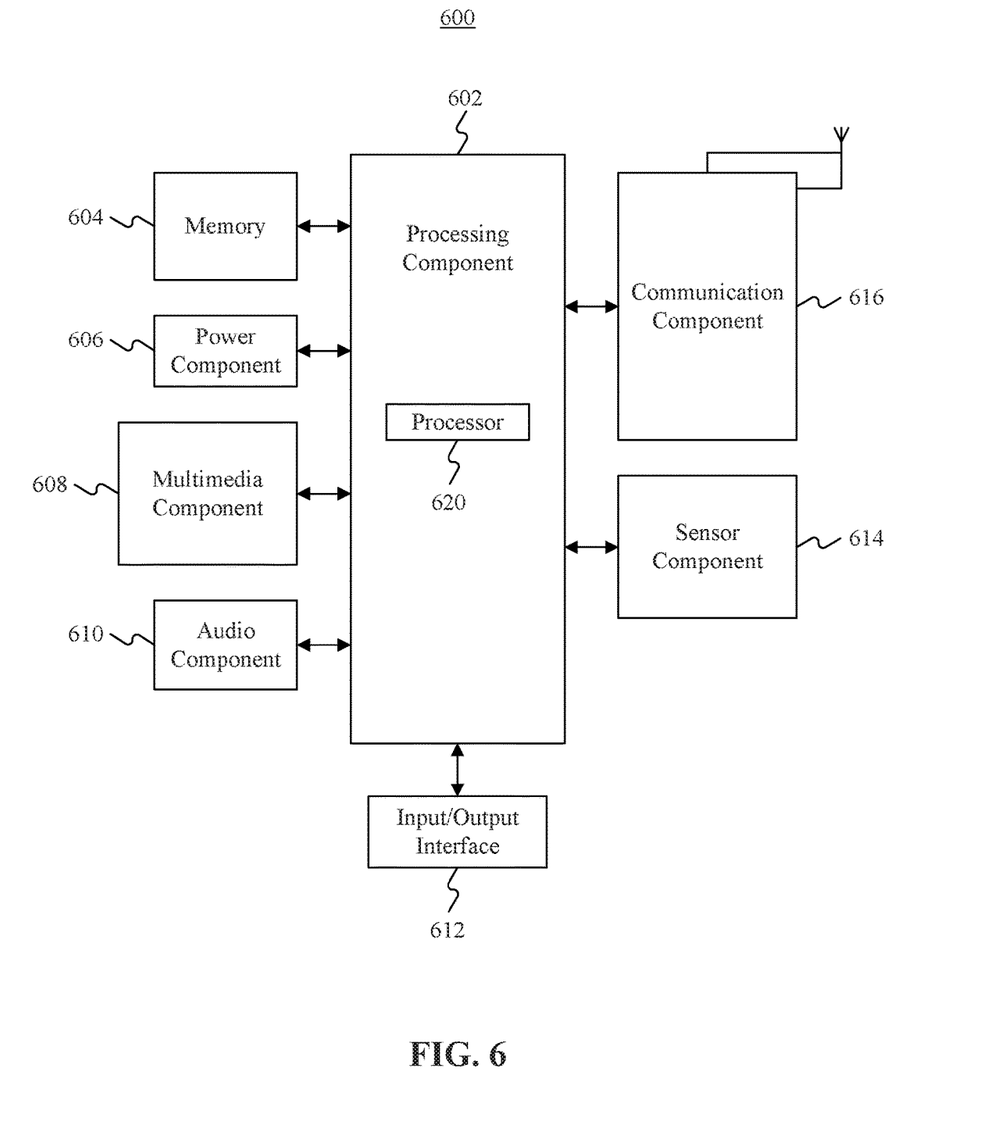
FIG. 6 is a block diagram illustrating another terminal according to an exemplary embodiment of the present disclosure.

Another exemplary embodiment of the present disclosure provides a terminal 600 for setting a waiting time duration. The terminal may be a mobile phone or the like. FIG. 6 shows a block diagram of the terminal 600.

Referring to FIG. 6, the terminal 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the terminal 600, such as the operations associated with display, telephone calls, data communications, camera operations, and recording operations. The processing component 602 may include one or more processors 620 to execute instructions to perform all or a part of the steps in the above-described methods. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operations of the terminal 600. Examples of such data include instructions for any application or method operated on the terminal 600, contact data, phonebook data, messages, pictures, videos, and the like. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the terminal 600. The power component 606 may include a power management system, one or more power supplies, and other components associated with the generation, management, and distribution of power in an audio input/output device 600.

The multimedia component 608 includes a screen providing an output interface between the terminal 600 and the user. In some embodiments, the screen may include a liquid crystal display and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive external multimedia data while the terminal 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the audio input/output device 600 is in an operation mode, such as a call mode, a recording mode, or a voice recognition mode. The received audio signal may be further stored in the memory 604 or transmitted via the communication component 616.

The I/O interface 612 provides an interface between the processing component 602 and a peripheral interface module, such as a keyboard, a click wheel, a button, or the like. The buttons may include, but are not limited to, a home button, a volume button, a starting button, and a locking button.

The sensor component 614 includes one or more sensors to provide status assessments of various aspects of the terminal 600. For example, the sensor component 614 may detect an open/closed status of the terminal 600, relative positioning of components, e.g., the display and the keypad, of the terminal 600, a change in position of the terminal 614 or a component of the terminal 600, a presence or absence of user contact with the terminal 600, an orientation or an acceleration/deceleration of the terminal 600, and a change in temperature of the terminal 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communications, wired or wirelessly, between the terminal 600 and other devices. The terminal 600 may access a wireless network based on a communication standard, such as WiFi, 2G, 3G or 4G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as the memory 604 including instructions, executable by the processor 620 in the terminal 600, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

A non-transitory computer-readable storage medium is provided. When instructions stored in the storage medium are executed by a processor of a terminal, the terminal is caused to perform any of the above methods.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for setting a waiting time duration, comprising:
controlling a target component to send preset data to a processor a plurality of times, and controlling the processor to receive the preset data sent by the target component each time based on a different waiting time duration;
determining, from the different waiting time durations, a maximum waiting time duration and a minimum waiting time duration that are used by the processor for correctly receiving the preset data; and
determining and storing a to-be-used waiting time duration according to the maximum waiting time duration and the minimum waiting time duration, wherein the to-be-used waiting time duration is to be used by the processor when the processor receives service data transmitted by the target component.

2. The method according to claim 1, wherein each two adjacent waiting time durations of the different waiting time durations have an interval of a preset time duration difference.

3. The method according to claim 1, wherein each of the different waiting time durations is within a standard time duration stipulated by a protocol.

4. The method according to claim 1, wherein the different waiting time durations include a first waiting time duration and a second waiting time duration adjacent to the first waiting time duration; and
the determining, from different waiting time durations, a maximum waiting time duration and a minimum waiting time duration that are used by the processor for correctly receiving the preset data comprises:
if the processor correctly receives the preset data by using the first waiting time duration but fails to correctly receive the preset data by using the second waiting time duration, and the first waiting time duration is less than the second waiting time duration, determining that the first waiting time duration is the maximum waiting time duration.

5. The method according to claim 4, wherein the different waiting time durations further include a third waiting time duration and a fourth waiting time duration adjacent to the third waiting time duration; and the determining, from different waiting time durations, a maximum waiting time duration and a minimum waiting time duration that are used by the processor for correctly receiving the preset data comprises:

if the processor correctly receives the preset data by using the fourth waiting time duration but fails to correctly receive the preset data by using the third waiting time duration, and the third waiting time duration is less than the fourth waiting time duration, determining that the fourth waiting time duration is the minimum waiting time duration.

6. The method according to claim 1, wherein the determining and storing the to-be-used waiting time duration according to the maximum waiting time duration and the minimum waiting time duration comprises:

determining and storing an average value of the maximum waiting time duration and the minimum waiting time duration.

7. The method according to claim 1, wherein the method further comprises:

when service data transmitted by the target component to the processor is detected, receiving the service data based on the to-be-used waiting time duration.

8. An apparatus for setting a waiting time duration, comprising:

a processor; and a memory for storing instructions executable by the processor, wherein the processor is configured to:

control a target component to send preset data to a processor a plurality of times, and control the processor to receive the preset data sent by the target component each time based on a different waiting time duration;

determine, from the different waiting time durations, a maximum waiting time duration and a minimum waiting time duration that are used by the processor for correctly receiving the preset data; and determine and store a to-be-used waiting time duration according to the maximum waiting time duration and the minimum waiting time duration, wherein the to-be-used waiting time duration is to be used by the processor when the processor receives service data transmitted by the target component.

9. The apparatus according to claim 8, wherein each two adjacent waiting time durations of the different waiting time durations have an interval of a preset time duration difference.

10. The apparatus according to claim 8, wherein each of the different waiting time durations is within a standard time duration stipulated by a protocol.

11. The apparatus according to claim 8, wherein the different waiting time durations include a first waiting time duration and a second waiting time duration adjacent to the first waiting time duration; and the processor is further configured to:

if the processor correctly receives the preset data by using the first waiting time duration but fails to correctly receive the preset data by using the second waiting time duration, and the first waiting time duration is less than the second waiting time duration, determine that the first waiting time duration is the maximum waiting time duration.

12. The apparatus according to claim 11, wherein the different waiting time durations further include a third waiting time duration and a fourth waiting time duration adjacent to the third waiting time duration; and the processor is further configured to:

if the processor correctly receives the preset data by using the fourth waiting time duration but fails to correctly receive the preset data by using the third waiting time duration, and the third waiting time duration is less than the fourth waiting time duration, determine that the fourth waiting time duration is the minimum waiting time duration.

13. The apparatus according to claim 8, wherein the processor is further configured to:

determine and store an average value of the maximum waiting time duration and the minimum waiting time duration.

14. The apparatus according to claim 8, wherein the processor is further configured to:

when service data transmitted by the target component to the processor is detected, receive the service data based on the to-be-used waiting time duration.

15. A non-transitory computer-readable storage medium having stored therein instructions that, when executed by one or more processors of an apparatus, cause the apparatus to perform:

controlling a target component to send preset data to a processor a plurality of times, and controlling the processor to receive the preset data sent by the target component each time based on a different waiting time duration;

determining, from the different waiting time durations, a maximum waiting time duration and a minimum waiting time duration that are used by the processor for correctly receiving the preset data; and determining and storing a to-be-used waiting time duration according to the maximum waiting time duration and the minimum waiting time duration, wherein the to-be-used waiting time duration is to be used by the processor when the processor receives service data transmitted by the target component.

* * * * *